May 29, 1956        F. A. SHERMAN        2,747,836
POWER OPERATED JACK ASSEMBLY
Filed March 1, 1954        3 Sheets-Sheet 1
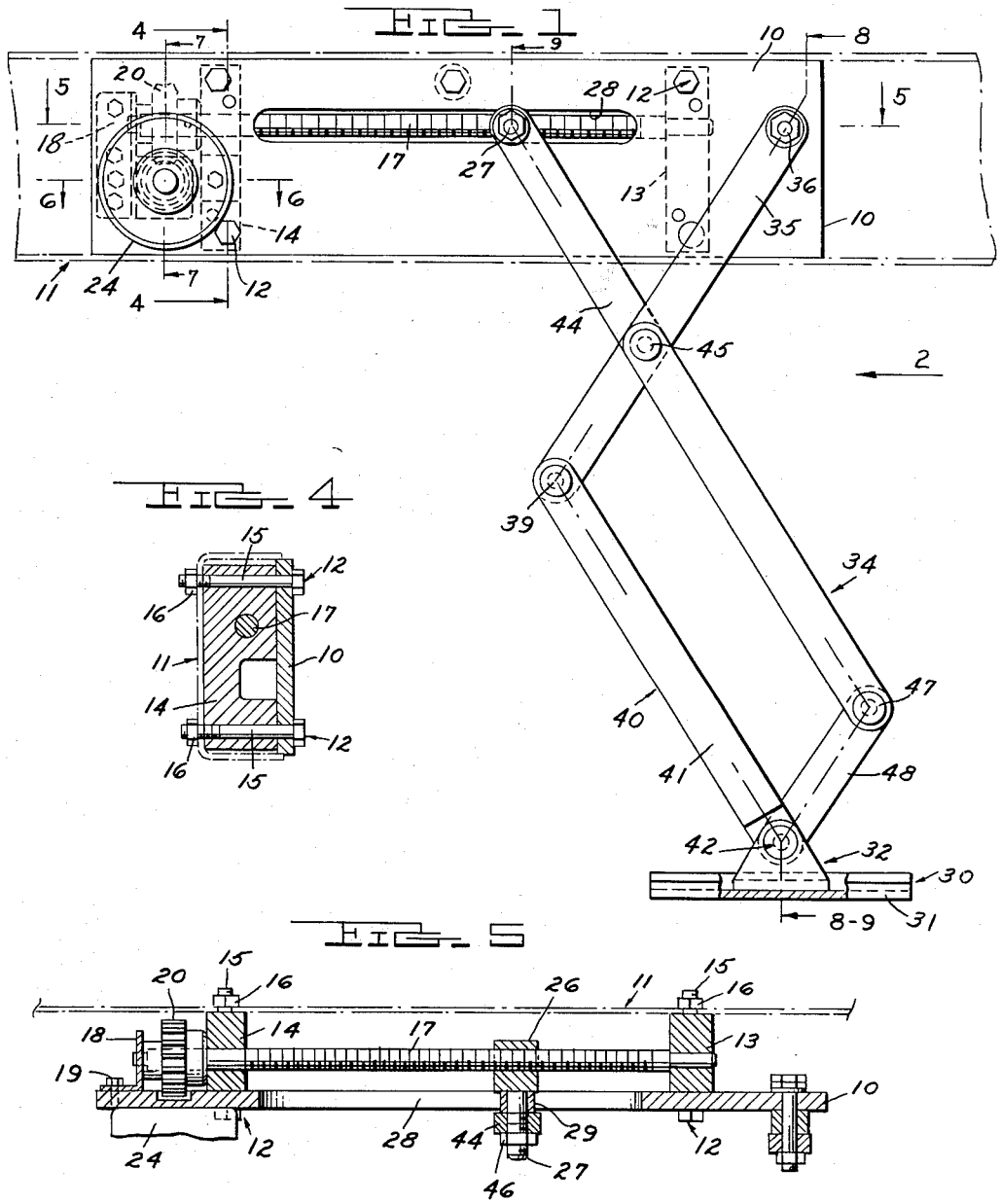
INVENTOR.
FLOYD A. SHERMAN
BY
*Whittemore, Hulbert & Belknap*
ATTORNEYS May 29, 1956  F. A. SHERMAN  2,747,836
POWER OPERATED JACK ASSEMBLY
Filed March 1, 1954  3 Sheets-Sheet 2
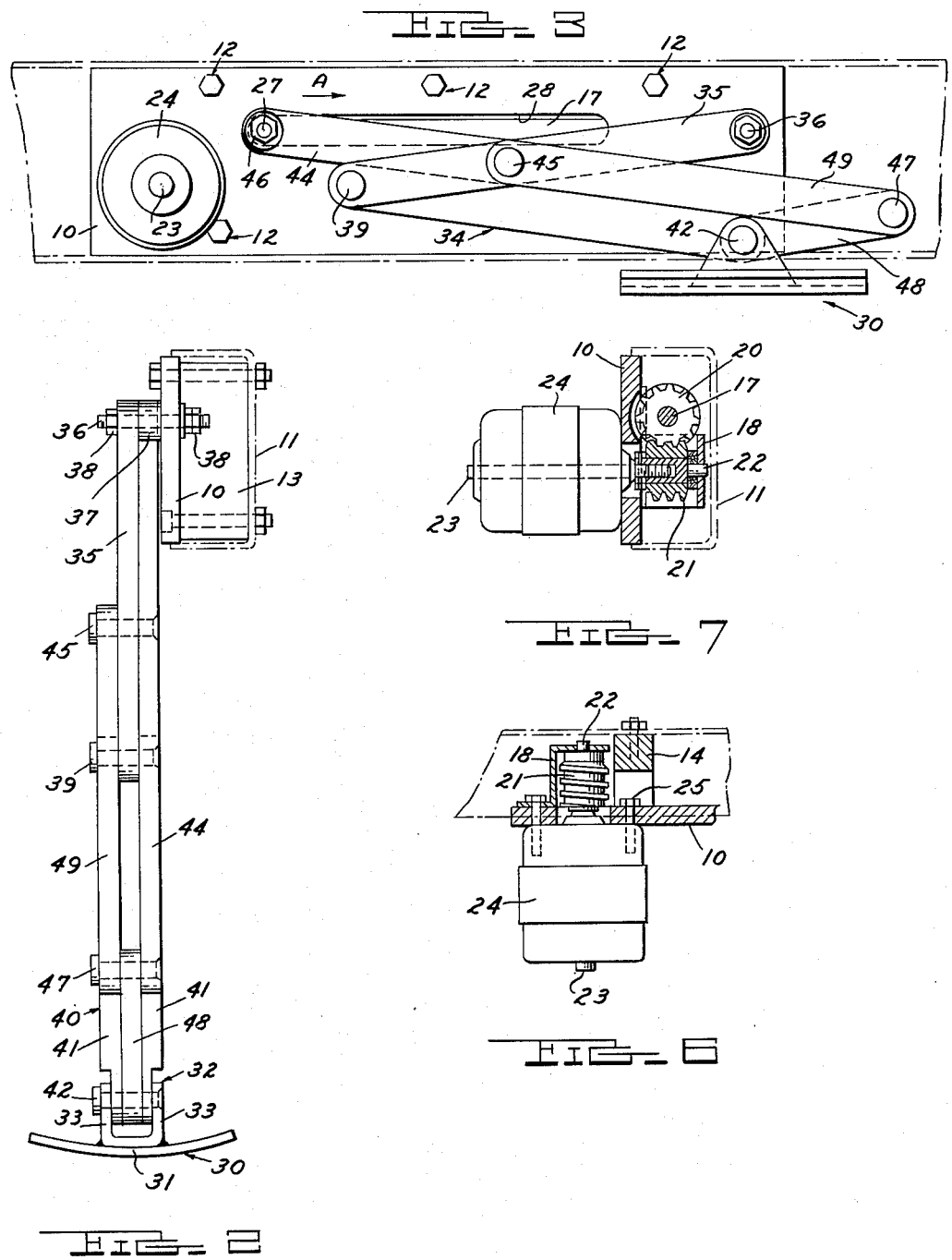
INVENTOR.
FLOYD A. SHERMAN
BY
ATTORNEYS May 29, 1956     F. A. SHERMAN     2,747,836
POWER OPERATED JACK ASSEMBLY
Filed March 1, 1954
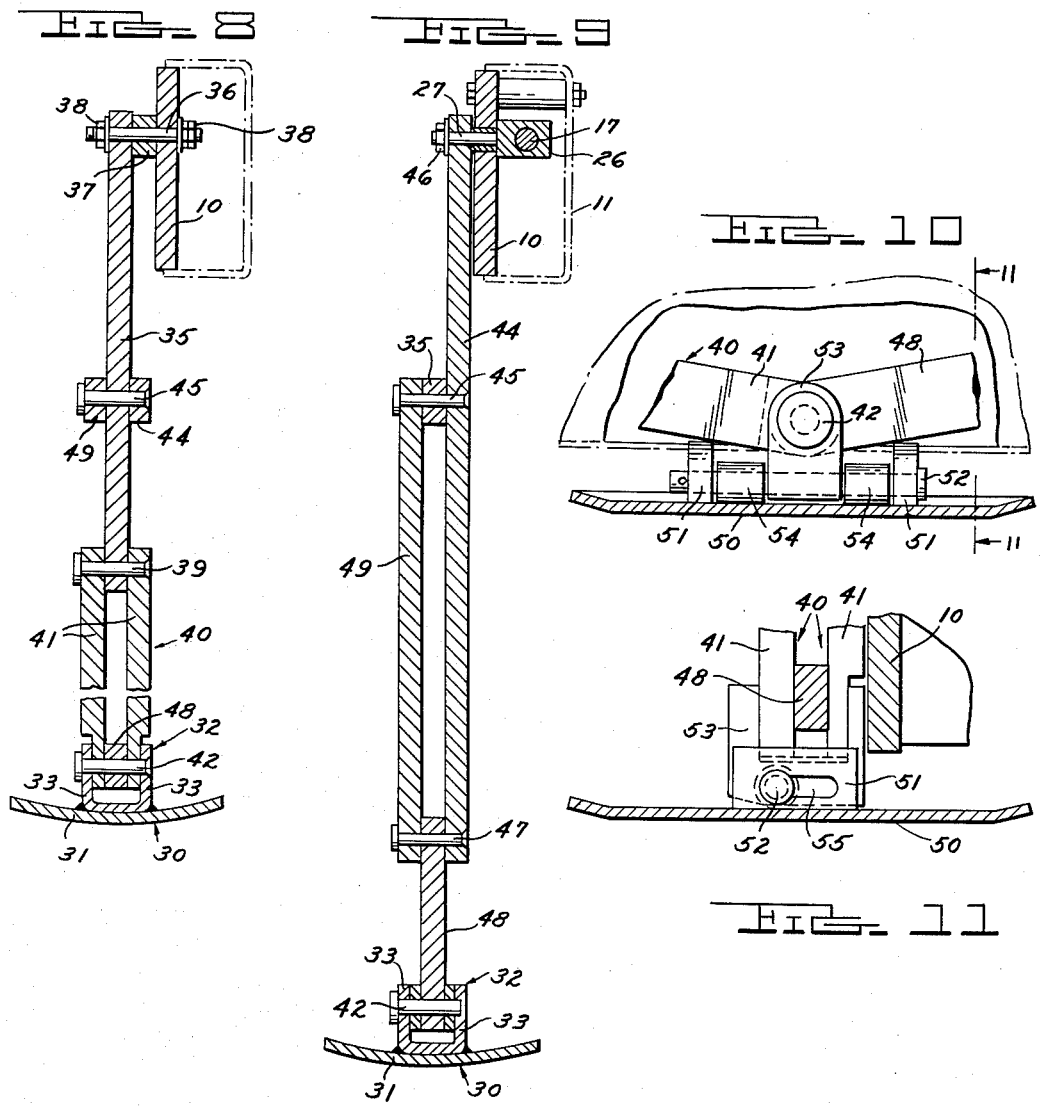
INVENTOR.
FLOYD A. SHERMAN
BY
ATTORNEYS

United States Patent Office 2,747,836
Patented May 29, 1956

2,747,836

POWER OPERATED JACK ASSEMBLY

Floyd A. Sherman, Birmingham, Mich., assignor to Motor Products Corporation, Detroit, Mich., a corporation of New York Application March 1, 1954, Serial No. 413,039

7 Claims. (Cl. 254—86)

This invention relates generally to lifting jacks and refers more particularly to improvements in power operated lifting jacks of the type attachable to vehicles.

It is an object of this invention to provide a power operated jack assembly composed of a relatively few simple parts capable of being inexpensively manufactured, assembled and installed on the frame structure or sprung assembly of a vehicle.

It is another object of this invention to provide a power operated jack assembly having parts capable of being housed in the channel of a conventional vehicle frame structure and in any case are of a nature rendering it possible to install the same in an exceptionally small space.

It is a further object of this invention to provide a vehicle jack assembly having power operated means connected to a ground engaging shoe or foot by arms pivotally connected together to provide a parallelogram arranged to assure vertical travel of the shoe or foot in a straight line, and to not only provide a decided mechanical advantage in favor of raising the vehicle, but to also provide for obtaining an increased rate of travel of the foot during initial downward movement from its uppermost position and during the final upward or return movement to the latter position.

The foregoing as well as other objects will be made more apparent as this description proceeds especially when considered in connection with the accompanying drawings, wherein:

Figure 1 is a side elevational view of a lifting jack assembly constructed in accordance with this invention and having certain parts broken away for the sake of clearness;

Figure 2 is an end elevational view looking in the direction of the arrow 2 in Figure 1;

Figure 3 is a side elevational view similar to Figure 1 showing the parts in a different position;

Figures 4–9 inclusive are respectively sectional views taken on the lines 4—4, 5—5, 6—6, 7—7, 8—8, and 9—9 of Figure 1;

Figure 10 is a fragmentary side elevational view partly in section of a slightly modified form of construction; and Figure 11 is a sectional view taken on the line 11—11 of Figure 10.

The jack assembly forming the subject matter of this invention is of a nature rendering it practical to permanently install on the sprung unit or frame structure of a vehicle one jack assembly adjacent each axle and/or ground engaging wheel, not shown. Regardless of the number of jack assemblies provided on a particular vehicle, all of said assemblies are preferably of the same construction and, hence, only one jack assembly is shown and described herein.

In detail, the jack assembly selected herein for the purpose of illustration comprises a mounting plate 10 attachable to suitable frame structure of a vehicle and having provision for securing the remaining parts of the jack assembly thereto in a manner to provide a unitary structure. Although it will be apparent as this description proceeds that the mounting plate 10 may be secured to various parts of a vehicle sprung assembly or frame structure, nevertheless, the plate 10 is shown herein as attached to a channel-shaped sill 11 which forms one side of a typical vehicle frame structure. In accordance with conventional practice, the channel of the sill 11 opens laterally inwardly and the mounting plate 10 is positioned at the open side of the channel in the manner shown in Figures 2 and 4 of the drawings. The mounting plate 10 extends lengthwise of the sill 11 and has a width approximating the width of the sill 11.

Referring now to Figure 5 of the drawings, it will be noted that the mounting plate 10 is secured to the base of the channel-shaped sill 11 by fastener elements 12 and spacer blocks 13 and 14. The blocks 13 and 14 are spaced from each other lengthwise of the plate 10 and project into the channel of the sill 11 sufficiently to engage the base of the channel. The fastener elements 12 comprise studs 15 which project through aligned openings in the mounting plate 10 and spacer blocks from the inner side of the mounting plate. The outer ends of the studs 15 project through openings formed in the base of the channel-shaped sill 11 and threadably receive clamping nuts 16.

Referring again to Figure 5 of the drawings, it will be noted that the spacer blocks also rotatably support a screw 17 having one end projecting beyond the block 14 and journaled on a bracket 18 which is secured to the mounting plate 10 by fastener elements 19. Secured to the portion of the screw 17 between the spacer block 14 and bracket 18 is a worm gear 20. As shown in Figure 7 of the drawings, the worm gear 20 meshes with a worm 21 which is secured to a supporting shaft 22 having its axis extending at right angles to the screw 17 beneath the worm gear 20 and having the outer end journaled on the bracket 18. The supporting shaft 22 is suitably secured to a drive shaft 23 of an electric motor 24, and the housing for the motor is secured to the inner side of the mounting plate 10 by studs 25.

It is apparent from the foregoing that the motor 24 is connected to the screw 17 by irreversible gearing and the motor 24 is of the reversible type to enable rotating the screw 17 in opposite directions. It will also be noted from the foregoing that the screw and irreversible gearing are actually housed within the channel of the sill 11 and, hence, are not only protected by the sill 11 but in addition occupy a space which is not ordinarily used.

Threadably mounted on the screw 17 intermediate the spacer blocks is a nut 26 having a stud 27 projecting inwardly from the inner side of the nut through a slot 28 formed in the mounting plate 10. The slot 28 is elongated in the direction of length of the mounting plate 10 in order to provide for rectilinear movement of the stud 27 in opposite directions in response to rotation of the screw 17 in opposite directions. As shown in Figure 5 of the drawings, an anti-friction roller 29 is mounted on the stud 27 in a position to engage the opposite longitudinal side surfaces of the slot 28. Thus, the nut 26 is held against rotation with the screw 17 and is guided along the mounting plate 10 with a minimum amount of wear.

As shown in Figures 1, 8 and 9 of the drawings, the jack assembly is provided with a ground engaging foot or shoe 30 comprising a plate 31 and a bracket 32. The bracket 32 is welded or otherwise permanently secured to the plate 31 intermediate the ends of the latter and has laterally spaced upstanding ears 33 which extend parallel to a plane including the mounting plate 10.

The ground engaging foot 30 is movable in a straight line vertical path of travel between its uppermost position adjacent the underside of the sill 11 (Fig. 3) and the operative position shown in Figure 1 of the drawings by pivotally connected arms arranged to form a parallelogram designated generally by the numeral 34. As shown in Figure 1, the parallelogram 34 has a substantially vertically extending arm 35 which is pivoted at its upper end to the mounting plate 10 beyond the end of the slot 28 by a pin 36. The pin 36 is in the form of a stud having its axis extending parallel to the axis of the stud 27 and arranged in a common horizontal plane with the axis of the stud 27. As shown in Figure 8 of the drawings, a spacer 37 is supported on the pivot pin 36 between the mounting plate 10 and the upper end of the arm 35. The spacer 37 and arm 35 are held in assembled relationship with the mounting plate 10 by suitable clamping nuts 38 threadably secured to opposite ends of the pivot pin 36. The lower end of the arm 35 is pivoted by a pin 39 to the upper end of an arm 40 comprising laterally spaced sections 41 respectively located at opposite sides of the arm 35. The lower ends of the sections 41 of the arm 40 project into the space provided between the ears 33 on the bracket 32 and are pivoted to the ears 33 by a pin 42.

The parallelogram 34 also has a substantially vertically extending arm 44 which crosses the arm 35 intermediate the ends of the latter and is pivoted at the point of crossing to the arm 35 by a pin 45. The upper end of the arm 44 is pivoted on the stud 27 at the inner side of the mounting plate 10 and is held in assembled relationship with the stud 27 by a nut 46. The lower end of the arm 44 is pivoted by a pin 47 to the upper end of an arm 48 and the lower end of the arm 48 is pivotally supported on the pin 42 between the lower ends of the sections 41 of the arm 40. Thus the lower end of the arm 48 also serves as a spacer between the sections 41 of the arm 40. As shown in Figure 9 of the drawings the portion of the arm 44 between the pivots 45 and 47 is reinforced by an arm 49 having the upper end mounted on the pivot 45 at the inner side of the arm 35 and having the lower end mounted on the pivot 47 at the inner side of the arm 48.

The axes of the pivot pins or studs 27, 36, 39, 42, 45 and 47 extend in parallel relationship perpendicular to the axis of the screw 17. In addition, the distance between the axes of the pivot pins 39 and 45 is equal to the distance between the axes of the pins 42 and 47. Also, the distance between the axes of the pins 45 and 47 is equal to the distance between the axes of the pins 39 and 42 with the result that the several arms cooperate to provide the parallelogram 34.

With the above construction, it will be noted that when the screw 17 is rotated in a direction to move the nut 26 in the direction of the arrow A in Figure 3, the foot 30 is moved downwardly in a straight vertical line from its uppermost position shown in Figure 3 toward the position shown in Figure 1. As movement of the nut 26 continues in the direction of the arrow A after the foot 30 engages the ground, the frame of the vehicle is raised and sufficient upward movement of the frame is provided to lift the adjacent ground engaging wheel from its supporting surface. Of course, rotation of the screw 17 in the opposite direction causes the nut 26 to move along the screw in a direction opposite that indicated by the arrow A in Figure 3 with the result that the ground engaging foot 30 is returned to its inoperative position adjacent the underside of the frame sill 11. It is to be noted that the parallelogram arrangement of arms, previously described, not only affords a substantial mechanical advantage in raising the sprung weight sufficiently to lift the adjacent ground engaging wheel from its supporting surface but, in addition, provides for obtaining an increased rate of travel of the foot 30 during initial movement of the foot downwardly from its uppermost position shown in Figure 3 and during the final stages of the return movement of the foot 30 to its uppermost position.

The embodiment of the invention shown in Figures 10 and 11 of the drawings illustrate a different form of ground engaging foot. In detail the ground engaging foot shown in Figures 10 and 11 comprises a plate 50 having spaced upstanding ears 51 provided with aligned openings therethrough for receiving a pin 52 leaving its axis extending perpendicular to the axis of the pin 42. The plate 50 is connected to the parallelogram 34 by a U-shaped bracket 53 having the base portion rotatably supported on the pin 52 between the ears 51 and having the upper ends of the leg portions pivotally engaging the pin 42. Thus the plate 50 is capable of turning movement about two axes extending at right angles to one another and, in effect, has a universal movement relative to the parallelogram 34. The plate 50 is centered with respect to the bracket 53 by spacers 54 respectively mounted on the pin 52 between the ears 51 and the adjacent sides of the bracket 53.

Referring now more in detail to Figure 11, it will be noted that the ears 51 have slots 55 which are elongated in a direction perpendicular to the axis of the pivot pin 52. The arrangement is such that the plate 50 may shift to a limited extent along the ground or supporting surface relative to the parallelogram 34. This action has been found particularly advantageous in cases where the plate 50 is engaged with a sloping supporting surface in that it enables the plate to in effect adjust itself to the supporting surface without stressing the parallelogram.

What I claim as my invention is:

1. A power operated lifting jack assembly attachable as a unit to a channel shaped sill of a vehicle and comprising a mounting plate attachable to said sill at the open side of said channel whereby said plate cooperates with the channel of said sill to form an elongated housing, a rotatable screw mounted upon said plate so as to be within and extend lengthwise of said housing, an electric motor carried by said plate, means also carried by said plate so as to be within said housing and operable by said motor for rotating said screw, a nut non-rotatably mounted on said screw and movable thereby lengthwise of said housing, a ground engaging foot movable vertically relative to said housing, and means connected to said nut and plate and operable when said nut is moved lengthwise of said housing by said rotatable screw for moving said foot vertically.

2. A power operated lifting jack assembly attachable as a unit to a frame member of a vehicle and comprising a mounting plate attachable to said frame member and having a longitudinally extending slot, a rotatable screw mounted upon and extending lengthwise of said plate, an electric motor carried by said plate, means also carried by said plate and operable by said motor for rotating said screw, a nut mounted on said screw and movable thereby lengthwise of said plate, a ground engaging foot movable vertically relative to said plate, and means operable when said nut is moved lengthwise of said plate by said rotatable screw for moving said foot vertically, including a stud projecting from said nut through and movable lengthwise of said slot, and linkage extending between said mounting plate and foot, certain of said linkage being connected to said stud and mounting plate, and certain of said linkage being connected to said foot.

3. A power operated lifting jack assembly attachable as a unit to a frame member of a vehicle and comprising a mounting plate attachable to said frame member and having a longitudinally extending slot, a rotatable screw mounted upon and extending lengthwise of said plate, an electric motor carried by said plate, means also carried by said plate and operable by said motor for rotating said screw, a nut mounted on said screw and movable thereby lengthwise of said plate, a ground engaging plate movable vertically relative to said mounting plate and having spaced upstanding ears, a pin extending through said spaced ears, a bracket rotatably mounted on said pin, and means operable when said nut is moved lengthwise of said plate by said rotatable screw for moving said ground engaging plate vertically, including a stud projecting from said nut through and movable lengthwise of the slot in said mounting plate, and linkage extending between said mounting plate and ground engaging plate, certain of said linkage being connected to said stud and mounting plate, and certain of said linkage being connected to said bracket.

4. A power operated lifting jack assembly attachable as a unit to a frame member of a vehicle and comprising a mounting plate attachable to said frame member and having a longitudinally extending slot, a rotatable screw mounted upon and extending lengthwise of said plate, an electric motor carried by said plate, means also carried by said plate and operable by said motor for rotating said screw, a nut mounted on said screw and movable thereby lengthwise of said plate, a ground engaging plate movable vertically relative to said mounting plate and having spaced upstanding ears provided with elongated slots, a pin extending through the elongated slots in said spaced ears, a bracket rotatably mounted on said pin, and means operable when said nut is moved lengthwise of said plate by said rotatable screw for moving said ground engaging plate vertically, including a stud projecting from said nut through and movable lengthwise of the slot in said mounting plate, and linkage extending between said mounting plate and ground engaging plate, certain of said linkage being connected to said stud and mounting plate, and certain of said linkage being connected to said bracket.

5. A power operated lifting jack assembly attachable as a unit to a frame member of a vehicle and comprising a mounting plate attachable to said frame member, a rotatable screw mounted upon and extending lengthwise of said plate, an electric motor carried by said plate, means also carried by said plate and operable by said motor for rotating said screw, a nut non-rotatably mounted on said screw and movable thereby lengthwise of said plate, a ground engaging foot movable vertically relative to said plate, and means operable when said nut is moved lengthwise of said plate by said rotatable screw for moving said foot vertically, including linkage extending between said plate and foot, certain of said linkage being connected to said nut and plate, and certain of said linkage being connected to said foot.

6. A power operated lifting jack assembly attachable as a unit to a frame member of a vehicle and comprising a mounting plate attachable to said frame member, a rotatable screw mounted upon and extending lengthwise of said plate, an electric motor carried by said plate, means also carried by said plate and operable by said motor for rotating said screw, a nut non-rotatably mounted on said screw and movable thereby lengthwise of said plate, a ground engaging plate movable vertically relative to said mounting plate and having spaced upstanding ears, a pin extending through said spaced ears, a bracket rotatably mounted on said pin, and means operable when said nut is moved lengthwise of said plate by said rotatable screw for moving said ground engaging plate vertically, including linkage extending between said mounting plate and ground engaging plate, certain of said linkage being connected to said nut and mounting plate, and certain of said linkage being connected to said bracket.

7. A power operated lifting jack assembly attachable as a unit to a frame member of a vehicle and comprising a mounting plate attachable to said frame member, a rotatable screw mounted upon and extending lengthwise of said plate, an electric motor carried by said plate, means also carried by said plate and operable by said motor for rotating said screw, a nut non-rotatably mounted on said screw and movable thereby lengthwise of said plate, a ground engaging plate movable vertically relative to said mounting plate and having spaced upstanding ears provided with elongated slots, a pin extending through the elongated slots in said spaced ears, a bracket rotatably mounted on said pin, and means operable when said nut is moved lengthwise of said plate by said rotatable screw for moving said ground engaging plate vertically, including linkage extending between said mounting plate and ground engaging plate, certain of said linkage being connected to said nut and mounting plate, and certain of said linkage being connected to said bracket.

References Cited in the file of this patent

UNITED STATES PATENTS

| 1,984,766 | Sessions et al. | Dec. 18, 1934 |
| 2,170,910 | Ostruk | Aug. 29, 1939 |
| 2,612,230 | Jezler | Sept. 30, 1952 |

FOREIGN PATENTS

| 408,784 | Great Britain | Apr. 10, 1934 |
| 1,008,341 | France | May 26, 1952 |